(12) United States Patent
Lanfant et al.

(10) Patent No.: US 11,111,798 B2
(45) Date of Patent: Sep. 7, 2021

(54) TURBOMACHINE BLADE AND METHOD FOR THE MANUFACTURE OF SAME

(71) Applicant: SAFRAN, Paris (FR)

(72) Inventors: Nicolas Pierre Lanfant, Moissy-Cramayel (FR); Pierre Jean Faivre D'Arcier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 273 days.

(21) Appl. No.: 16/490,115

(22) PCT Filed: Mar. 1, 2018

(86) PCT No.: PCT/FR2018/050474
§ 371 (c)(1),
(2) Date: Aug. 30, 2019

(87) PCT Pub. No.: WO2018/158544
PCT Pub. Date: Sep. 7, 2018

(65) Prior Publication Data
US 2020/0003061 A1    Jan. 2, 2020

(30) Foreign Application Priority Data

Mar. 2, 2017 (FR) ...................................... 1751713

(51) Int. Cl.
*F01D 5/28* (2006.01)
*F01D 9/04* (2006.01)
(Continued)

(52) U.S. Cl.
CPC ............. *F01D 5/282* (2013.01); *F01D 5/147* (2013.01); *F01D 9/041* (2013.01);
(Continued)

(58) Field of Classification Search
CPC ........ F01D 5/147181; F01D 9/02; F01D 9/04; F01D 9/041
See application file for complete search history.

(56) References Cited

U.S. PATENT DOCUMENTS 4,045,149 A * 8/1977 Ravenhall ................. F01D 5/26
416/135
4,343,593 A * 8/1982 Harris ..................... F01D 5/282
416/193 A (Continued)

FOREIGN PATENT DOCUMENTS

| WO | WO 2013/079859 A1 | 6/2013 |
|---|---|---|
| WO | WO 2013/079860 | 6/2013 |
| WO | WO 2014/135798 A1 | 9/2014 |

OTHER PUBLICATIONS

International Search Report as issued in International Patent Application No. PCT/FR2018/050474, dated May 7, 2018.

*Primary Examiner* — Woody A Lee, Jr.
(74) *Attorney, Agent, or Firm* — Pillsbury Winthrop Shaw Pittman LLP

(57) ABSTRACT

A blade of a turbomachine includes a blade body of composite material having a fiber reinforcement having a three-dimensional weave and densified by a matrix, the reinforcement having a first part extended by a second, end, part including two segments separated from each other; and an insert having a pi-shaped section, the insert having a platform part and two longitudinal flanges separated from each other, the platform part including a housing delimited by a bottom wall and a rim, the bottom wall including an opening communicating with the space between the two flanges, the first part of the fiber reinforcement being clamped between the two flanges of the insert, the segments of the second part of the fiber reinforcement being folded against the bottom wall of the housing.

15 Claims, 4 Drawing Sheets

(51) Int. Cl.
*F01D 5/14* (2006.01)
*B29D 99/00* (2010.01)
*B29L 31/08* (2006.01)
*D03D 25/00* (2006.01)

(52) U.S. Cl.
CPC ....... *B29D 99/0025* (2013.01); *B29L 2031/08* (2013.01); *D03D 25/005* (2013.01); *F05D 2300/702* (2013.01)

(56) References Cited

U.S. PATENT DOCUMENTS

| | | | | |
|---|---|---|---|---|
| 4,786,347 | A * | 11/1988 | Angus | B29C 45/0005 156/172 |
| 5,292,231 | A * | 3/1994 | Lauzeille | F01D 5/282 416/229 A |
| 5,439,750 | A * | 8/1995 | Ravenhall | C22C 1/1036 428/614 |
| 6,196,794 | B1 * | 3/2001 | Matsumoto | B29C 66/1282 415/191 |
| 6,676,373 | B2 * | 1/2004 | Marlin | B29C 70/222 415/191 |
| 6,821,087 | B2 * | 11/2004 | Matsumoto | F01D 9/042 415/191 |
| 7,241,112 | B2 * | 7/2007 | Dambrine | F04D 29/324 415/230 |
| 8,297,934 | B2 * | 10/2012 | Lutz | F04D 29/644 416/230 |
| 2016/0108746 | A1 | 4/2016 | Riehl | |
| 2017/0051617 | A1 | 2/2017 | Guilbert et al. | |

\* cited by examiner

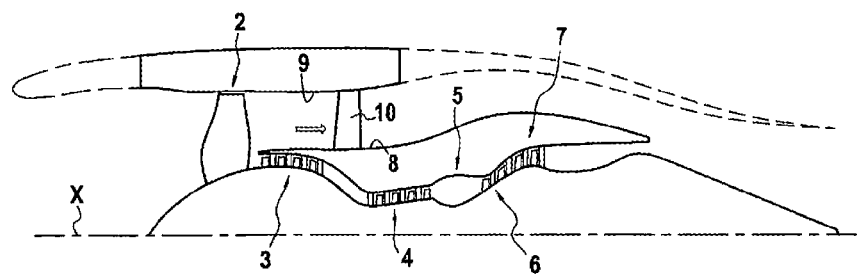
FIG.1
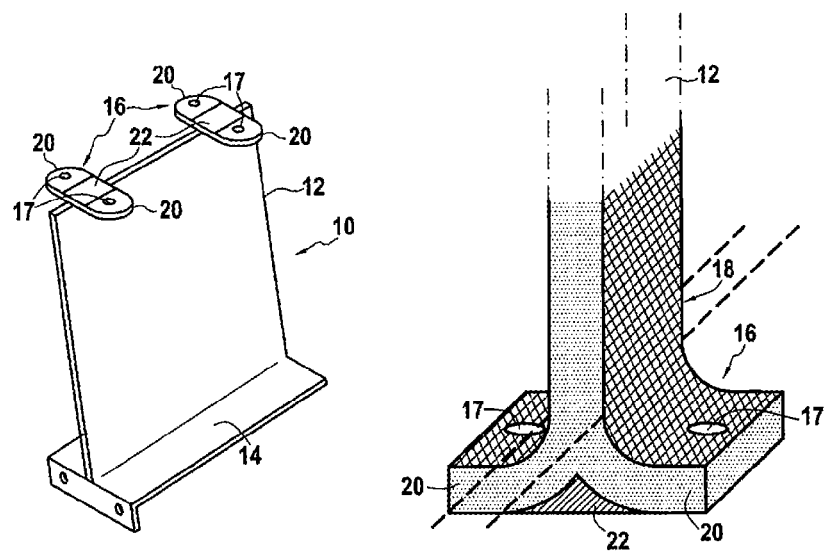
FIG.2
PRIOR ART
FIG.3
PRIOR ART

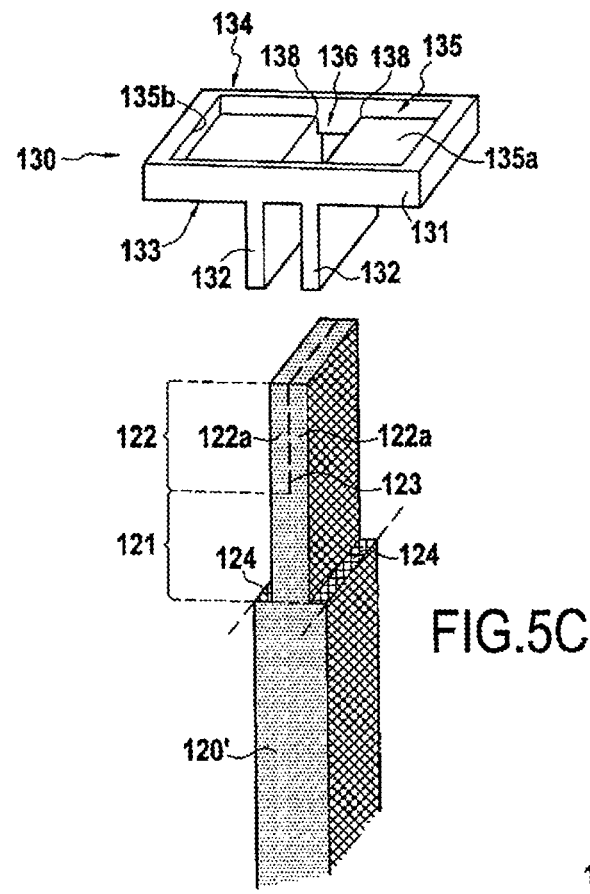
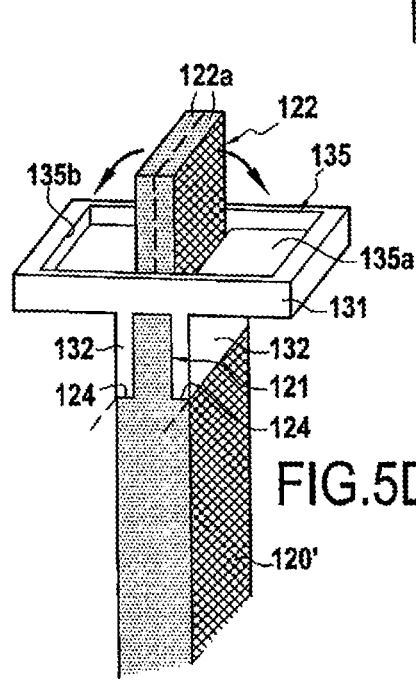
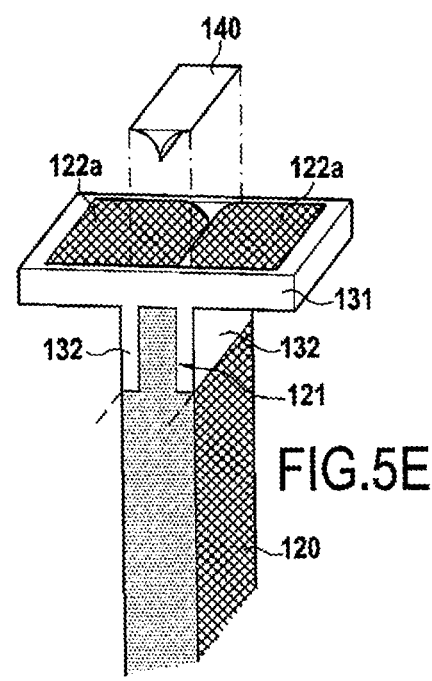

TURBOMACHINE BLADE AND METHOD FOR THE MANUFACTURE OF SAME

CROSS-REFERENCE TO RELATED APPLICATIONS

This application is the U.S. National Stage of PCT/FR2018/050474, filed Mar. 1, 2018, which in turn claims priority to French patent application number 1751713 filed Mar. 2, 2017. The content of these applications are incorporated herein by reference in their entireties.

BACKGROUND OF THE INVENTION

The present invention relates to the general field of turbomachine blades. It relates more particularly, but not exclusively, to an outlet guide vane of an aeronautical turbomachine secondary flow rectifier having a blade body of composite material and a platform insert.

FIG. 1 shows a schematic view in longitudinal section of a turbofan engine 1 centered on the X axis. It comprises, from upstream to downstream: a fan 2, a low-pressure compressor 3, a high-pressure compressor 4, a combustion chamber 5, a high-pressure turbine 6, and a low-pressure turbine 7. At the inlet of the turbojet engine 1, the flow of air entering the fan 2 is divided into a primary flow or hot flow, and a secondary flow or cold flow. The flow channel of the secondary flow conventionally comprises a rectifier provided with outlet guide vanes 10 (OGV) disposed downstream of the fan 2, and whose particular function is to straighten the cold flow at the outlet of the fan 2 to obtain maximum thrust. These blades 10 also have a structural function and must be able, in particular, to withstand forces exerted by the engine in operation (for example tangential bending, also called "fan twist"), or a shock due to the ingestion of an object by the blower 2, or the detachment of a blade of the blower 2. Thus, these blades 10 must provide both satisfactory mechanical properties while being thin enough to improve the propulsive performance of the engine by limiting its mass.

It is known to make the outlet guide vanes 10 of a composite material comprising a fiber reinforcement densified by a matrix, for example an organic matrix, in order to obtain a part that offers good mechanical strength while having a reduced mass. An example of a blade 10 of the prior art composite material is shown in perspective in FIG. 2. The blade 10 comprises a blade body 12 which extends radially (relative to the axis X) between an internal platform 14 by means of which the blade 10 is fixed to an inner casing 8 of the turbojet engine 1, and two external platforms 16. The external platforms 16 here comprise openings for fixing the blade to an outer casing 9 of the turbojet, and, because of their position, these are highly stressed in tangential bending when the engine is running.

FIG. 3 shows a perspective view illustrating the design principle of the platform 16 of composite material comprising a fiber reinforcement 18 (corresponding to the fiber reinforcement also forming the blade body 12) densified by a matrix. The fiber reinforcement 18 has, at the platform 16, two segments 20 which are disconnected from one another and folded on either side of the blade body 12. An insert 22 is present at the level of the joining of the two segments 20 in order to reinforce the platform 16. Conventionally, such a blade 10 is made from a three-dimensional fiber-reinforced preform densified by a matrix according to a resin transfer molding (RTM) process. Such blades 10 offer advantages in terms of simplicity of manufacture and reduction of the mass of the blade.

However, the mechanical strength of these outlet guide vanes 10 may be further improved, especially at the platforms 16 to ensure the attachment of the blade 10 to the turbojet engine.

OBJECT AND SUMMARY OF THE INVENTION

The main purpose of the present invention is therefore to provide a turbomachine blade architecture offering improved mechanical strength, wherein a blade according to the invention comprises:
- a blade body of composite material having a fiber reinforcement with a three-dimensional weave and densified by a matrix, the fiber reinforcement having a longitudinal direction corresponding to the longitudinal direction of the blade and having, in this longitudinal direction, a first part extended by a second, end, part, the second part comprising two segments separated from each other from the junction between the first and the second parts to a free end of the fiber reinforcement; and
- an insert having a pi-shaped section ($\pi$), the insert having a platform part extending perpendicularly to the longitudinal direction, and two longitudinal flanges separated from each other by a space, the platform part comprising a housing delimited by a bottom wall and a flange, the bottom wall comprising an opening communicating with the space between the two flanges,
- the first part of the fiber reinforcement of the blade body being sandwiched between the two flanges of the insert, the segments of the second part of the fiber reinforcement being folded on either side of the first part against the bottom wall of the housing of the insert.

With the aid of simulations taking into account the tangential, tensile and compressive bending forces imposed on the blade during operation, it has been shown that the turbomachine blade architecture according to the invention is an excellent compromise between a reduction in mass compared with metal blades, and improved mechanical strength compared to composite blades of the prior art, and, in particular, those presented in the introduction above. In particular, the mechanical strength of the blade according to the invention is improved at the platform insert. The blade according to the invention is also simple to manufacture thanks to a three-dimensional woven fiber reinforcement and the use of a single insert to form a platform.

By "three-dimensional weaving" or "3D weaving" is meant here a weaving mode wherein at least some of the warp yarns bind weft yarns on several weft layers. Of course, the terms "weft" and "warp" in the previous definition are completely interchangeable.

In an exemplary embodiment, the segments of the second part of the fiber reinforcement may be not interlinked or separated from each other in a plane containing the longitudinal and transverse directions of the fiber reinforcement.

In an exemplary embodiment, the blade may further comprise an insert between the segments of the second part of the fiber reinforcement at the junction between said segments. This insert can fill the space at the junction between the segments of the second part of the fiber reinforcement. In this way, the housing of the insert can be filled, which allows a flat surface to be obtained at the face of the attached element opposite the blade body. This arrangement makes it possible to further improve the mechanical strength of the assembly. This insert may be glued using an adhesive or a resin, for example using the resin used to make the blade.

In an exemplary embodiment, the blade may further comprise at least one mounting hole passing through the insert and a segment of the second part of the fiber reinforcement. The mounting hole allows the passage of fastening means (screws, rivets, etc.) to fix the blade to another part of the turbomachine, for example a housing. Thus, the attachment of the blade is improved, since the fastening means engage with the insert and the fiber reinforcement of the blade body. In this case, it may be advantageous for the dimensions of the segments of the second part of the fiber reinforcement to be such that the segments cover the entire bottom wall of the housing. Alternatively, the mounting hole need not pass through a segment of the second part of the fiber reinforcement.

In an exemplary embodiment, the blade may further comprise an adhesive film between the fiber reinforcement of the blade body and the insert. This arrangement makes it possible to further improve the adhesion between the fiber reinforcement and the insert by increasing the mechanical strength of the platform at the interfaces between the fiber reinforcement and the insert, in particular for the tangential bending stresses. The adhesive film may comprise a resin, for example thermoplastic or thermosetting resin.

In an exemplary embodiment, the fiber reinforcement of the blade body may comprise carbon fibers. Alternatively, the fiber reinforcement of the blade body may comprise glass fibers or Kevlar.

In an exemplary embodiment, the matrix of the blade body may be an organic matrix or a ceramic matrix. An organic matrix may be obtained, for example, from a thermoplastic or thermosetting resin.

In an exemplary embodiment, the insert may be of composite material having a fiber reinforcement densified by a matrix. The material for the insert may be advantageously chosen in order to reduce the differential expansion between the blade body, also of composite material, and the insert.

Alternatively, the insert may be of a metallic material, for example stainless steel, titanium, aluminum, or one of their alloys. In this case, it may be advantageous for the blade to further comprise a fold of glass fibers between the fiber reinforcement of the blade body and the insert. This fold of glass fibers makes it possible to reduce the galvanic coupling which might arise between any carbon which may be present in the fibers of the fiber reinforcement of the blade and the metal of the insert.

In an exemplary embodiment, the insert may be of a plastic material, and obtained, for example, from a thermoplastic or thermosetting resin, filled or not.

In an exemplary embodiment, the insert may be present throughout the transverse dimension of the blade body.

In an exemplary embodiment, the blade may comprise a plurality of elements attached to the same end of the blade body, including two inserts.

In an exemplary embodiment, the blade may comprise at least one element attached to each opposite longitudinal end of the blade body, in particular on its radially inner end (with respect to the axis of the turbomachine) and on its radially outer end.

In an exemplary embodiment, the blade may constitute an aeronautical turbomachine outlet guide vane. The blade may also constitute another type of fixed blade of a turbomachine, for example a stator blade in a compressor or a distributor blade in a turbine. The blade could also be a blade mounted on a rotor, for example an aeronautical turbomachine fan blade.

The invention also relates to a turbomachine comprising a blade such as that described above.

Finally, the invention also relates to a method of manufacturing a turbomachine blade comprising: a blade body of composite material having a fiber reinforcement densified by a matrix, the blade body extending in a longitudinal direction corresponding to the longitudinal direction of the blade; and an insert having a pi-shaped section, the insert having a platform part extending perpendicular to the longitudinal direction, and two longitudinal flanges separated from each other by a space, the platform part comprising a housing delimited by a bottom wall and a flange, the bottom wall comprising an opening communicating with the space between the two flanges, the method comprising the following steps:

formation by three-dimensional weaving of a fiber preform intended to form the fiber reinforcement of the blade body of the blade, the preform having a longitudinal direction corresponding to the longitudinal direction of the blade to be produced and having, in this longitudinal direction, a first part extended by a second, end, part, the second part comprising two segments separated from each other from the junction between the first and the second part to a free end of the preform, insertion of the fiber preform into the opening of the insert so that the first part of the preform is sandwiched between the flanges of the insert, while the segments of the second part protrude from the wall of the bottom of the housing, folding each segment of the second part of the fiber preform on either side of the first part to fold against the bottom wall of the housing and obtain a blade blank, placing the blade blank in the cavity of a mold having the shape of the blade to be produced, injecting a resin into the mold cavity in which the blade blank has been placed in order to impregnate the blank with resin, and heat treating the impregnated blank in order to transform the resin blank to obtain the blade.

In an exemplary embodiment, the method may further comprise, before the insertion of the fiber preform into the opening of the insert, a step of compacting the first and second parts of the fiber preform. This step may be advantageous when, following weaving, the fiber preform is expanded, and the insertion of the latter between the flanges and the opening of the insert may be difficult to achieve.

BRIEF DESCRIPTION OF THE DRAWINGS

Other features and advantages of the present invention will emerge from the description given below, with reference to the accompanying drawings which illustrate an embodiment having no limiting character. In the figures:

FIG. 1 shows a schematic sectional view of a turbofan engine,

FIG. 2 shows a perspective view of an outlet guide vane of the prior art,

FIG. 3 shows the design principle of the blade of the prior art of FIG. 2 at the level of a platform, FIGS. 4A and 4B respectively show views in perspective and in section of a blade according to one embodiment of the invention, and FIG. 5A to 5E show different steps of a method of manufacturing a blade according to one embodiment of the invention.

DETAILED DESCRIPTION OF THE INVENTION

Figure 4B:
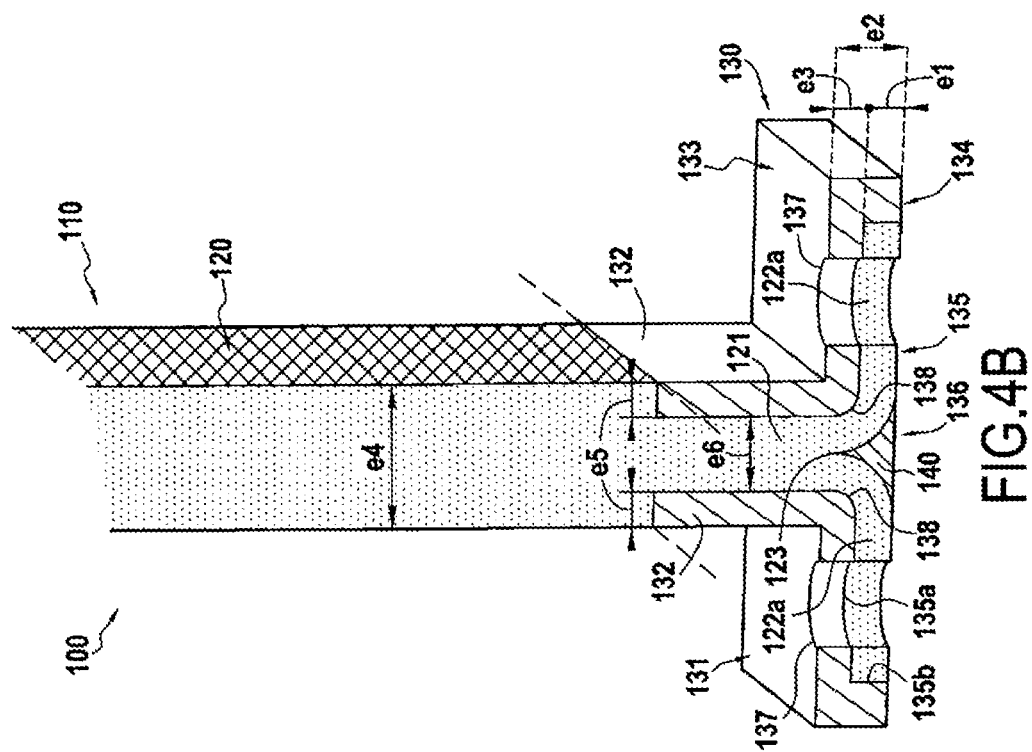
Figure 4A:
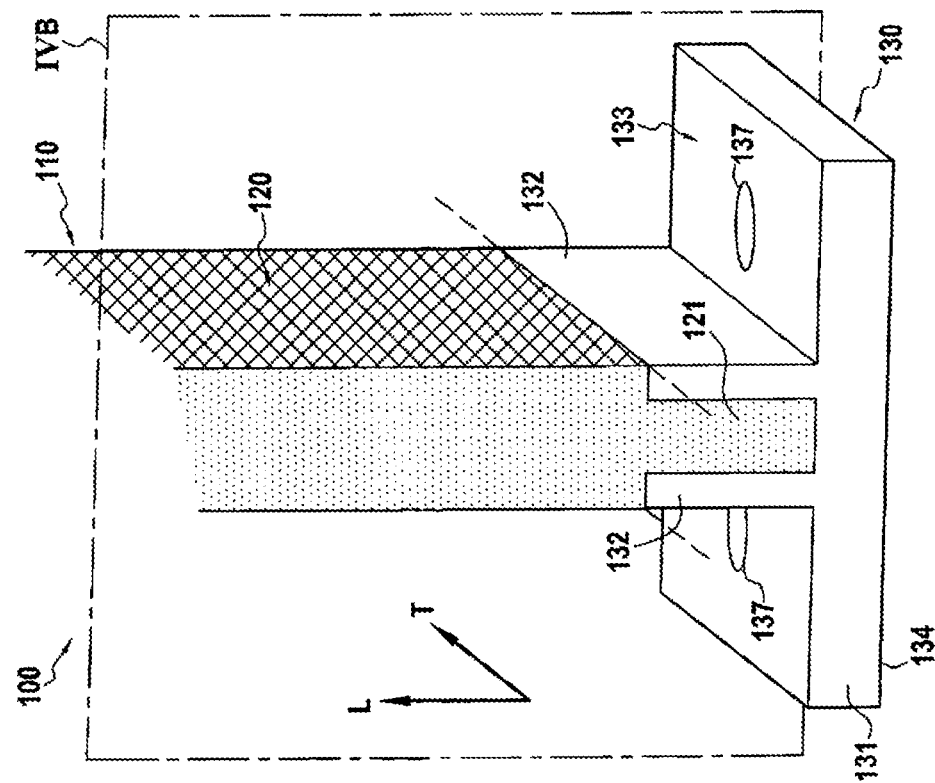

A blade 100 according to the invention will be described in connection with FIGS. 4A and 4B, FIG. 4B showing a section of the blade 100 of FIG. 4A according to its thickness. It will be noted that FIGS. 4A and 4B show simplified views that illustrate the principle of design of the blade 100, and especially at a platform of this blade. The blade 100 may have, for example, a general shape similar to that of the blade 10 presented in the introduction.

The blade 100 comprises a blade body 110 of composite material comprising a fiber reinforcement 120 having a three-dimensional weave densified by a matrix. The blade body 110 of the blade generally extends in a longitudinal direction L, which furthermore corresponds to the longitudinal direction of the blade. The blade body 110 extends transversely (in the direction T) between a leading edge and a trailing edge (not shown). The fiber reinforcement 120 may comprise fibers. The fiber reinforcement may comprise, for example, carbon fibers, ceramic fibers, glass fibers, or Kevlar. The fiber reinforcement 120 may have an interlock weave, known per se. The matrix of the blade body 110 may be an organic matrix, or a ceramic matrix. The matrix may be obtained, for example, from a matrix precursor resin, thermoplastic or thermosetting. When the fiber reinforcement is obtained by weaving, the longitudinal direction L may be included in the weaving plane of the fiber reinforcement.

The blade 100 further comprises an insert 130, acting here as a platform, having a n-shaped section, i.e. having a platform part 131 (horizontal bar of the π), and two longitudinal flanges 132 (vertical bars of the π). In the example illustrated in these figures, it will be noted that the π is upside down. The platform part 131 is located at one end of the blade body 110, and extends perpendicularly thereto. The flanges 132 are separated from each other by a certain non-zero space, in which the fiber reinforcement 120 of the blade body is present.

The platform part 131 of the insert 130 includes a first face 133 located on the blade body 110 side, and a second face 134 located on the opposite side to the blade body 110. The flanges 132 thus extend in the longitudinal direction L from the face 133 of the platform part 131 to the blade body 110. The platform part 131 further comprises, at the face 134, a housing 135 delimited by a bottom wall 135a and by a rim 135b. The insert 130 is furthermore provided with an opening 136 in the bottom wall 135a of the housing 135 that is in communication with the space separating the two flanges 132. The opening 136 of the insert 130 is traversed by the fiber reinforcement 120 of the blade body 110.

The fiber reinforcement 120 of the blade body comprises a first part 121 extended by a second, end, part 122 (FIG. 5A to 5E). The first part 121 is sandwiched between the flanges 132 of the insert 130. In the illustrated example, the first part 121 and the second part 122 have a dimension in the transverse direction T which is substantially equal to or less than the dimension of each flange 132 in the transverse direction T. The second part 122 comprises two segments 122a separated from one another from a junction 123 between the first part 121 and the second part 122 to one end of the fiber reinforcement 120. The delimitation between the two segments 122a here extends in a plane containing the directions L and T. The segments 122a are folded on either side of the first part 121 inside the housing 135. Each segment 122a thus rests against the bottom wall 135a of the housing 135. In general, the dimensions of the segments 122a of the second part 122 will be adapted relative to those of the opening 136. Note that the insert 130 may have fillets 138 inside the housing 135 and at the opening 136 to avoid damaging the fiber reinforcement 120 with too sharp edges.

The insert 130 may further comprise mounting holes 137 (here two in number) which pass through the insert from one side to the other in the longitudinal direction L. These mounting holes 137 may allow the attachment of the blade 100 inside a turbomachine. In the illustrated example, the mounting holes 137 are located on either side of the flanges 132 and each passes through a segment 122a of the fiber reinforcement 120. In a variant not shown, the mounting holes 137 do not pass through the segments 122a and thus have a reduced length compared to those illustrated in the figures.

The insert 130 may be of a composite material comprising fiber reinforcement densified by a matrix. In this case, the fiber reinforcement of the insert may comprise fibers, for example carbon or ceramic. The matrix may in turn be an organic or ceramic matrix, for example obtained from a thermoplastic or thermosetting resin. Alternatively, the insert 130 may be of a plastic material (i.e. without fiber reinforcement), for example obtained from a resin, loaded or not. Still alternatively, the insert 130 may be of a metallic material, for example stainless steel, titanium or aluminum. In this case, and to avoid possible galvanic couplings when the blade body comprises carbon, a ply of glass fibers (not shown) may be provided between the fiber reinforcement 120 of the blade body and the insert 130. This ply of glass fibers may be integrated, in particular, into the surface of the fiber reinforcement during the weaving of the latter.

The blade 100 finally comprises, in the illustrated example, an insert 140 acting as a stopper or filling piece, positioned between the segments 122a of the fiber reinforcement 120 at the junction 123. The insert 140 has a section of generally triangular shape to allow filling of the free space between the segments 122a, and, therefore, filling of the entire interior volume of the housing 135. The insert 140 may be glued. The insert 140 may be of a plastic material.

In the example illustrated, the thickness e1 of each segment 122a is substantially equal to the depth of the housing 135. The total thickness e2 of the platform part 131 is in turn substantially equal to the sum of the thickness e1 and each segment 122a and the thickness e3 of the platform part 131 at the housing 135. The fiber reinforcement 120 in the blade body 110 has a thickness e4, each flange 132 has a thickness e5, and the first part 121 of the fiber reinforcement 120 sandwiched between the two flanges 132 has a thickness e6. It will be noted that the thickness e6 corresponds here to the space between the two flanges 132. In the example illustrated, the thickness e4 is substantially equal to the sum of the two thicknesses e5 of the flanges 132 and the thickness e6 of the first part 121 of the fiber reinforcement 120, so that the surface of the blade body 110 is continuous between the flanges 132 and the blade body 110, and that the presence of the flanges 132 does not alter the aerodynamic surface of the blade 100.

Note that the blade 100 has been shown in a simplified manner in the figures, wherein the platform part 131 and the housing 135 are generally parallelepiped shape. However, it is not beyond the scope of the invention when these elements are of different geometric shapes.

The blade 100 may constitute an outlet guide vane of an aeronautical turbomachine secondary flow rectifier, for example a turbofan engine such as that illustrated in FIG. 1. In a variant, the blade 100 may be used in other parts of the turbomachine, for example in a compressor or a turbine.

An example of a method of manufacturing a blade 100 according to the invention will now be described in connection with FIG. 5A to 5E.

First of all, there is the three-dimensional weaving of a preform 120' (FIG. 5A) which will constitute the fiber reinforcement 120 of the blade 100. The term "fiber preform" is used here to denote the fiber reinforcement 120 being manufactured until it shows its shape and final dimensions. The weaving may be performed in a loom Jacquard type as is well known.

The fiber preform 120' has, after weaving, the first part 121 and the second part 122, said second part 122 comprising the two segments 122a separated from each other from the junction 123 between the two parts 121 and 122 and until a free end of the preform 120'. If necessary, the woven preform 120' may be cut to eliminate any layer exits. The document WO2013079860 discloses an example of a turbomachine blade of composite material comprising a woven fiber reinforcement having zones of non interlinking where segments are separated from each other.

Figure 5A:
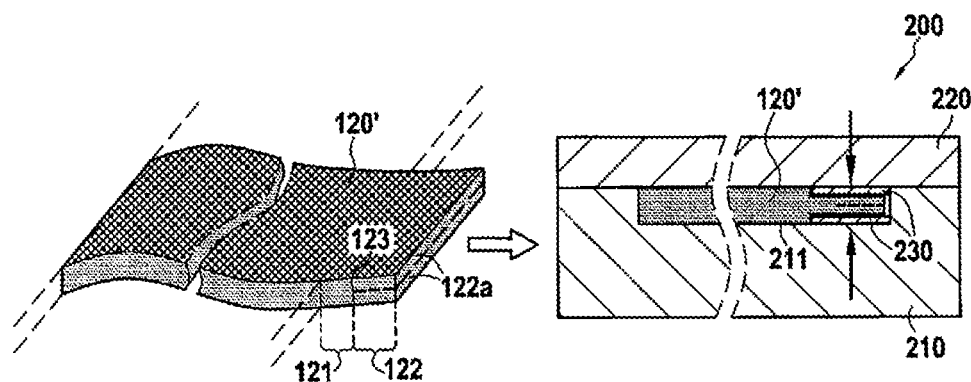

The fiber preform 120' is then placed in compaction tooling 200 to compact the first 121 and second 122 parts to facilitate their subsequent insertion into the insert 130 (FIG. 5A). In fact, the preform 120' may be swollen after weaving and it may be necessary to compact it to continue the manufacturing process. During the compacting step, the preform 120' may have been wetted, for example with osmosis water or distilled water. In this case, a drying step may be necessary. In addition, the preform 120' may be heated locally during compaction. The tool 200 comprises a mold 210 provided with a cavity 211 in which the preform 120' is placed, and a counter mold 220 which may be positioned on the mold 210 to close it. Compaction of the parts 121 and 122 of the preform 120' is achieved here by means of wedges 230 which are interposed between the mold 210 and the preform 120', and between the preform 120' and the counter-mold 220 in the cavity 211. The wedges 230 may have a thickness equal to or slightly greater than the thickness e5 of each flange 132 of the insert 130. Thanks to this optional compaction step, it is possible to reduce the thickness of the preform 120' at the first and second parts 121 and 122 to a value between 90% and 100%, for example 95%, of its final thickness. Following this step, the fiber preform 120' has flanges 124 at the junction between the first part 121 and the remainder of the preform 120'.

Figure 5B:
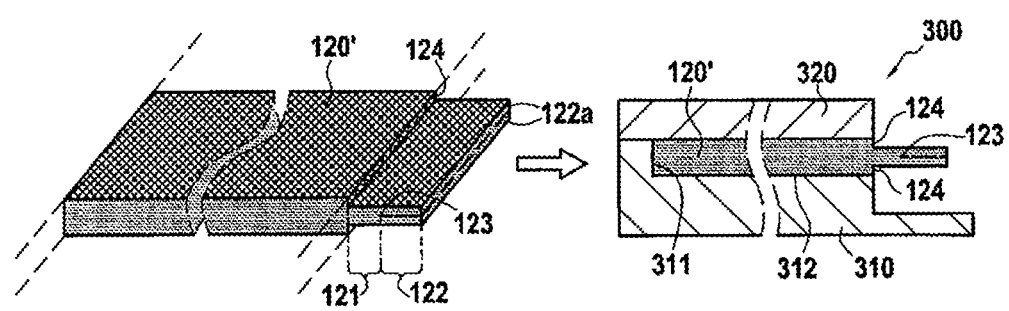

Then, to facilitate the subsequent insertion of the preform 120' in the insert 130, it may be placed in a holding tool 300 (FIG. 5B). The holding tool 300 comprises a first part 310 provided with a flange 311 against which the end of the preform 120' opposite the parts 121 and 122, is pressed. The tool 300 further comprises a second part 320 positioned on the first part 310 forming with the first part 310 an open cavity 311 which protrudes from the previously compacted first and second parts 121 and 122. The first and second parts 310 and 320 of the tool 300 are thus aligned with the flanges 124 of the preform 120'. The holding tool 300 may also be used to shape the preform 120' at its part intended to form the blade body 110 of the blade 100, in a manner known per se.

In the next step illustrated in FIG. 5C, the preform 120' is still held firmly in the holding tool 300 (not shown in this figure), while the insert 130 is approached by the first and second 121 and 122 parts of the fiber preform 120'. During this step, it is necessary to carefully orient the insert 130 so that the flanges 132 extend towards the end of the preform 120' comprising the first and second 121 and 122 parts previously compacted. The second part 122 of the preform 120' is then inserted into the opening 136 of the insert 130 until it protrudes beyond the other side of the insert 130 until the first part 121 is clamped between the flanges 132, and the flanges 124 abut against the flanges 132. Note that the presence of flanges 124 is related to the compaction step previously carried out, but that their presence is not mandatory to achieve the insertion of the preform 120' into the insert 130. Similarly, the use of the tooling 200 is not mandatory. It is possible, before inserting the preform 120' in the insert 130, to add a fold or ply of glass fibers on the first and second parts 121 and 122 to avoid their direct contact with the insert 130.

Then, as illustrated in FIG. 5D, each segment 122a of the second part 122 is folded on either side of the first part 121 in order to fold them against the bottom wall 135a of the housing 135. It is possible to add a layer of glue or resin to the visible faces of the segments 122a before folding, or to the bottom wall 135a in order to increase the adhesion between the insert 130 and the fiber preform 120'. After this step, the fiber reinforcement 120 of the blade 100 is obtained in which the segments 122a are in contact with the bottom wall 135a and the assembly between the fiber reinforcement 120 and the insert 130 is now a blade blank.

Then, as shown in FIG. 5E (insert 140 may be positioned inside the housing 135 to fill the empty space at the junction between the segments 122a, and to reinforce the connection between the insert 130 and the fiber reinforcement 120. The insert 140 may be glued to the segments 122a.

Finally, the previously produced blade blank, possibly including the insert 140, may be placed in the cavity of a mold having the final shape of the blade to be manufactured (not shown), and a resin may be injected into the mold cavity in order to impregnate the fiber reinforcement 120 by filling its porosity with resin (RTM process). It is possible to proceed with the drying of the fiber reinforcement 120 before the injection (for a thermosetting resin) or regulating the temperature of the mold (for a thermoplastic resin) makes it possible to solidify the resin and to complete the densification of the blade 100. Thus, the insert 130 and the insert 140 are co-injected with the fiber reinforcement 120, which makes it possible to secure these elements to each other even more efficiently and to obtain an aerodynamic surface for the blade 100 which is continuous. It will be noted that other methods known to persons skilled in the art may be implemented to densify the blade, especially according to the material chosen for the matrix.

The densification resin used in the injection molding process may be a thermosetting resin belonging to the family of epoxides, bismaleimides, polyimides, polyesters, alkyl esters, cyanate esters, phenolics, and the like. Alternatively, the resin may be a thermoplastic resin of the phenylene polysulfide (PPS), polysulfone (PS), polyethersulfone (PES) (polyamide-imide (PAI), polytherimide (PEI), or of the family of polyaryletherketones (PAEK): PEK, PEKK, PEEK, PEKKEK etc.

It will be noted that the injection step may be carried out directly in the compacting tool 200 or the holding tool 300. The holding tool 300 may be the compaction tooling 200.

In a last step, it is possible to drill mounting holes 137 in the insert 130, in order to obtain a blade 100 like that illustrated in FIGS. 4A and 4B.

The invention claimed is:

1. Blade of a turbomachine comprising:
a blade body of composite material having a fiber reinforcement having a three-dimensional weave and densified by a matrix, the fiber reinforcement having a longitudinal direction corresponding to the longitudinal direction of the blade and having, in this longitudinal direction, a first part extended by a second, end, part, the second part comprising two segments separated from each other from the junction between the first and second parts to a free end of the fiber reinforcement; and
an insert having a pi-shaped section, the insert having a platform part extending perpendicularly to the longitudinal direction, and two longitudinal flanges separated from each other by a space, the platform part comprising a housing delimited by a bottom wall and a rim, the bottom wall including an opening communicating with the space between the two flanges,
the first part of the fiber reinforcement of the blade body being clamped between the two flanges of the insert, the segments of the second part of the fiber reinforcement being folded on either side of the first part against the bottom wall of the housing of the insert.

2. The blade according to claim 1, further comprising an insert present between the segments of the second part of the fiber reinforcement at the junction between said segments.

3. The blade according to claim 1, further comprising at least one mounting hole extending through the insert and a segment of the second part of the fiber reinforcement.

4. The blade according to claim 1, further comprising a glue film between the fiber reinforcement of the blade body and the insert.

5. The blade according to claim 1, wherein the fiber reinforcement of the blade body comprises carbon fibers.

6. The blade according to claim 1, wherein the blade body matrix is an organic matrix or a ceramic matrix.

7. The blade according to claim 1, wherein the insert is of composite material having matrix-densified fiber reinforcement.

8. The blade according to claim 1, wherein the insert is of a metallic material.

9. The blade according to claim 8, further comprising a ply of glass fibers between the fiber reinforcement of the blade body and the insert.

10. The blade according to claim 1, wherein the insert is present throughout the transverse dimension of the blade body.

11. The blade according to claim 1, comprising a plurality of inserts on the same end of the blade body.

12. The blade according to claim 1, constituting an aeronautical outlet guide vane of a turbomachine.

13. Aeronautical turbomachine comprising a blade according to claim 1.

14. Method of manufacturing a turbine engine blade comprising: a blade body of composite material having a fiber reinforcement densified by a die, the blade body extending in accordance with a longitudinal direction corresponding to the longitudinal direction of the blade; and an insert having a pi-shaped section, the insert having a part of the platform extending perpendicularly to the longitudinal direction, and two longitudinal flanges separated from each other by a space, the platform part comprising a housing delimited by a bottom wall and a rim, the bottom wall comprising an opening communicating with the bottom space between the two flanges, the method comprising:
forming by three-dimensional weaving of a fiber preform intended to form the fiber reinforcement of the blade body of the blade, the preform having a longitudinal direction corresponding to the longitudinal direction of the blade to be produced and having, in this longitudinal direction, a first part extended by a second, end, part, the second part comprising two segments separated from each other from the junction between the first and the second part to a free end of the preform,
inserting the fiber preform in the opening of the insert so that the first part of the preform is sandwiched between the flanges of the insert and that the segments of the second part protrude from the bottom wall of the housing,
folding of each segment of the second part of the fiber preform on either side of the first part to fold against the bottom wall of the housing in order to obtain a blade blank,
placing of the blade blank in the cavity of a mold having the shape of the blade to be produced,
injecting a resin into the cavity of the mold in which the blade blank is present in order to impregnate the blank with resin, and
heat treating the impregnated blank in order to transform the resin and obtain the blade.

15. The method according to claim 14, further comprising compacting the first and second parts of the fiber preform prior to insertion of the fiber preform into the opening of the insert.

* * * * *